Sept. 7, 1926.
G. H. DUNLOP
1,598,855
HAND PROPELLED VEHICLE
Filed Feb. 3, 1926    2 Sheets-Sheet 1
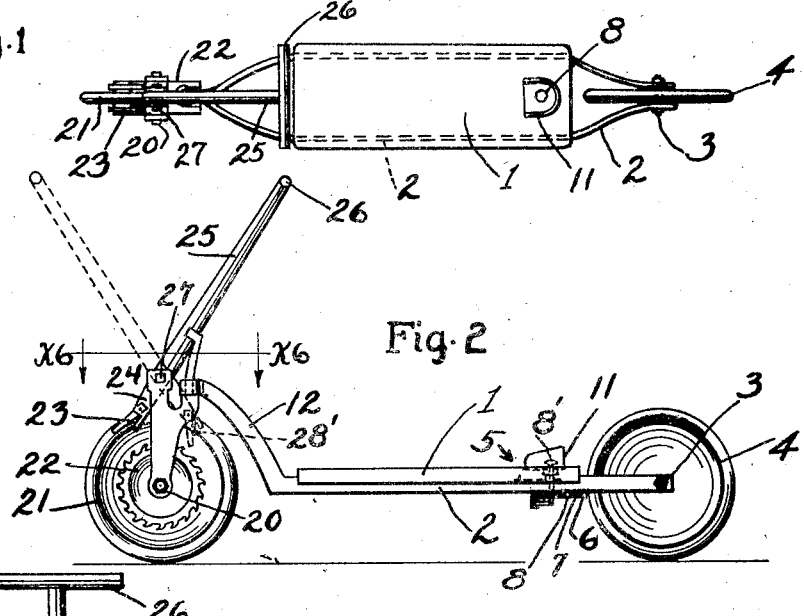
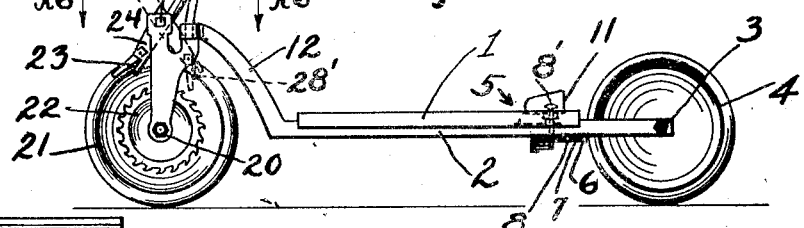
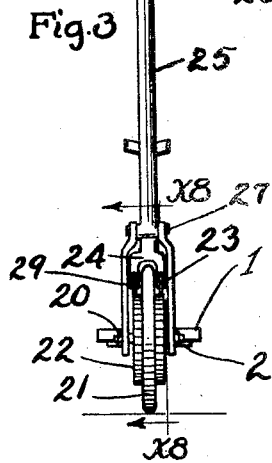
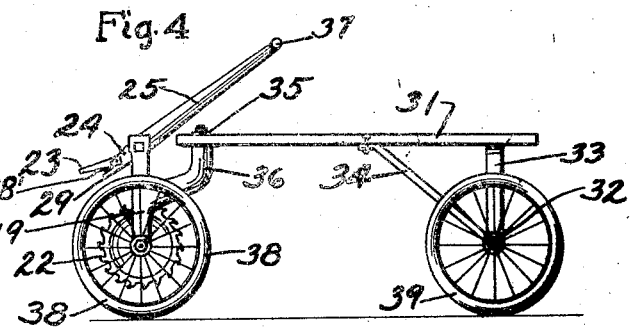
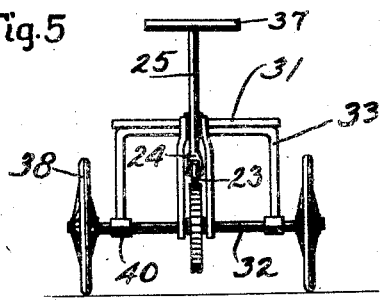
WITNESS
Robt. S. Woolsey
INVENTOR
GEORGE H. DUNLOP
James R. Townsend
his atty

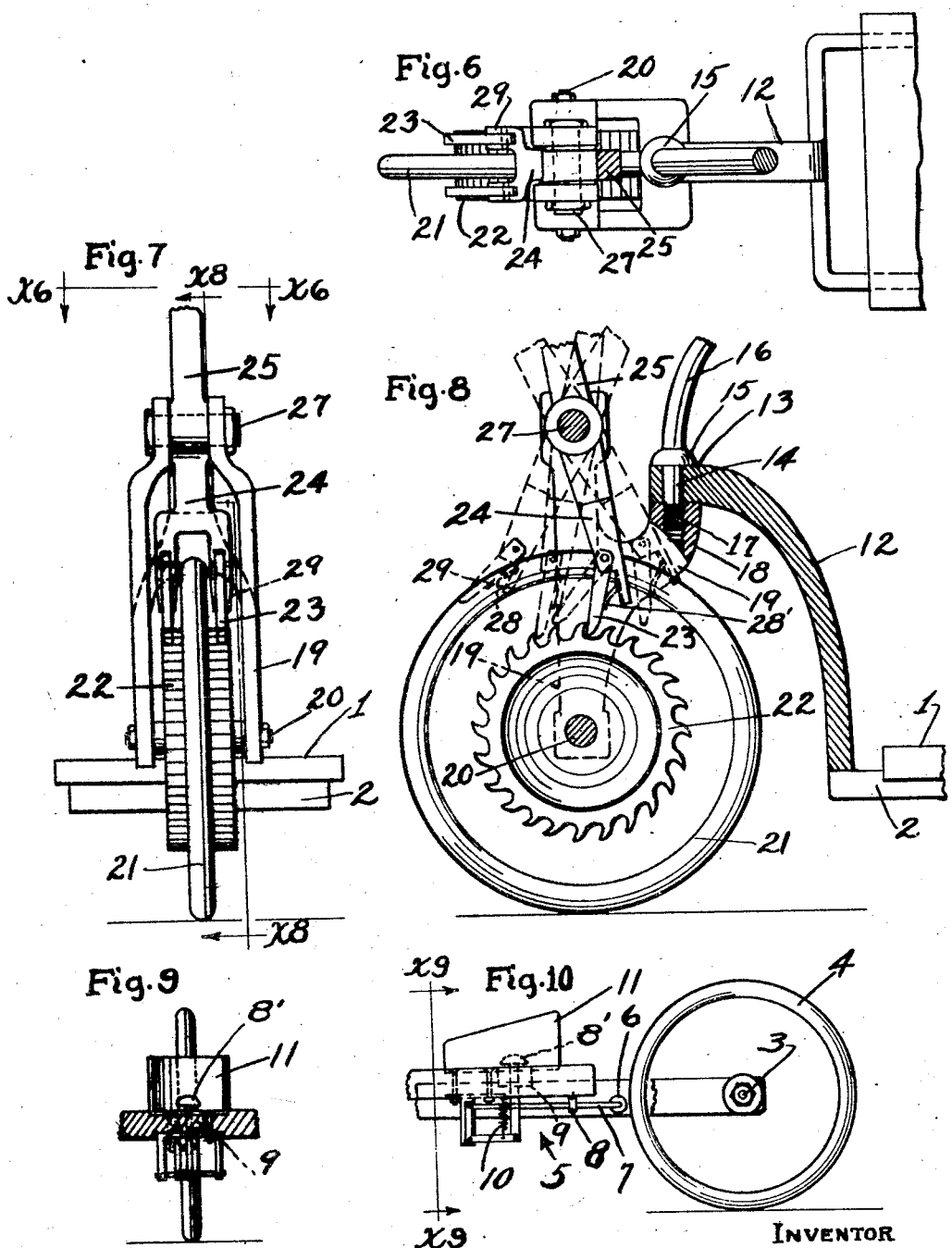

Patented Sept. 7, 1926.

1,598,855

UNITED STATES PATENT OFFICE.

GEORGE H. DUNLOP, OF HOLLYWOOD, CALIFORNIA.

HAND-PROPELLED VEHICLE.

Application filed February 3, 1926. Serial No. 85,624.

This invention relates more particularly to devices for propelling small vehicles having two or more wheels such as scooters and other two wheelers, vehicles, tricycles, four wheelers, etc.

The main object of this invention is to provide a device whereby a unitary movable handle can be used both to propel the vehicle and to guide it; the handle being so arranged, that when not in motion for the purpose of propelling the vehicle, it can be held stationary, or used as a means of support, or to guide with, while the vehicle continues to move under the force of momentum.

A further object is to provide a hand propelled vehicle of the character above outlined that may be constructed without heavy propelling gear, and that will not meet resistance by momentum set up in the propelling mechanism.

To accomplish this the movable handle transmits its motion through a tooth or pawl and ratchet wheel arrangement.

When the handle is actually transmitting motion to the vehicle, the tooth and ratchet wheel are temporarily firmly engaged with each other so that the tooth transmits motion to the ratchet wheel and so to the vehicle.

When motion is not being transmitted, the ratchet wheel continues passing by the tooth without contact with it.

The arrangement is such that a forward motion may be given the vehicle by a backward pull on the top of the handle, thus affording means for purposes of balance and efficiency on the part of the rider or driver as he moves the handle forward and back.

The handle is oscillatably mounted on a horizontal axis, so that a backward motion at the top of the handle produces a forward push at the bottom of the handle, where the tooth or pawl for the ratchet wheel is attached; said tooth also being movable on a horizontal axis carried by the lower end of the handle. Though the handle is movable forward and back on the horizontal axis, nevertheless it is sufficiently firm on the horizontal axis so that by giving the handle a right or left turn it can be used to guide the front wheel or wheels, to the ends of the axle of which the support for the horizontal axis of the handle is attached.

The front wheel or wheels and the upright rising from the axle thereof are swivelled to a frame so that all turn together on a vertical axis by which they are connected with the balance of the vehicle. The swivel is such a joint as permits the free turning of the front wheel or wheels independently of the rear part of the vehicle.

The tooth and ratchet wheel may be single or in duplicate, or more, the teeth being connected up to the common stem of the handle above them.

The upper part of the handle can be safeguarded from being pushed too far forward, by a metal strap guard, surrounding the proper course of the handle as it moves forward and back.

Any one of various forms of brakes can be used for stopping the vehicle. A particular form of brake intended to be covered by these Letters-Patent, is as follows: In the case of a vehicle where the driver stands with his feet on a platform of the vehicle, as on a scooter, there is placed across the front or the rear of the platform on which the rider stands, a piece of wood or metal, downward pressure on which from the foot of the driver serves to apply the brake. Rising up from the platform at the rear and sides of this piece of wood or metal is a U or V shaped guard, to accommodate the rider's heel and high enough to prevent the foot of the driver from coming in contact with a wheel of the vehicle, said guard having its open side towards the front and the sides of the guard tending to guide the foot to the most appropriate point for the application of downward pressure. Said piece of wood or metal, on its side towards the driver's foot, should meet smoothly with the platform on which the driver stands to facilitate slipping his foot upon it when he desires to apply the brake.

Objects of the invention are simplicity of construction and to afford scope for skill and efficiency in propelling and guiding the vehicle.

Another object is to provide for certainty and effectiveness of operation; and in this respect, the invention comprises in combination with a driving wheel and an axle of a vehicle; a handle having pawls on opposite sides of the driving wheel; and ratchet wheels connected to the driving wheel on opposite sides thereof for engagement of the pawls to drive the wheel as the upper end of the handle is drawn back.

The frame of the vehicle is carried by front and rear antifriction supports which may be one or more wheels at front and one or more wheels at the back, the front antifriction support comprising a propelling wheel to which the handle is connected by ratchet means or the equivalent to drive the propelling wheel forward.

Other objects, advantages and features of invention may appear from the accompanying drawings, the subjoined detailed description and the appended claims.

The accompanying drawings illustrate the invention.

Figure 1 is a plan of my invention in one of its forms with the handle drawn back into rest position.

Fig. 2 is a side elevation of the vehicle shown in Fig. 1; broken lines indicate a forward position of the handle.

Fig. 3 is a front elevation of the device shown in Figs. 1 and 2.

Fig. 4 is a side elevation of the invention applied in a four wheel vehicle.

Fig. 5 is a front elevation of the vehicle shown in Fig. 4.

Fig. 6 is a plan showing operative parts; the view being in section on line indicated at $x^6$, Figs. 2 and 7.

Fig. 7 is a front elevation of the mechanism shown in Fig. 6.

Fig. 8 is a view partly in longitudinal mid-section showing the operative mechanism in driving position, in solid lines, and in forward and rearward positions, in broken lines.

Fig. 9 is a detached view in section on line $x^9$, Fig. 10.

Fig. 10 is a broken side elevation illustrating means for guarding the brake operating button.

The body of the vehicle may be of any approved type and is shown in Figs. 1 and 2 as a wooden platform 1 mounted on a metal frame 2, the rear end of which is supported by an axle 3 of a rubber tired rear wheel 4, that is controlled by a brake 5, the construction of which is more clearly illustrated in Fig. 10, in which the brake shoe 6 is a roller carried by a reciprocating brake rod 7 supported by a bearing 8 fixed to the underside of the platform 1.

The brake 5 may be of any appropriate form operable by a tread 8 projecting up from the platform and operating through a hole 9 in the platform 1 to receive pressure from the heel of the rider to apply the brake against the pressure of a spring 10 which releases the brake when pressure from the foot is removed.

11 is a guide and guard closed at sides and rear and open at front to accommodate the heel of the rider and hold the heel in position so that downward pressure of the heel on the tread 8' will operate the brake.

The front of the frame may be variously constructed and in Figs. 1 and 8 is shown as an upward and forward extension 12 having at its front end a bearing 13 for a king bolt 14 formed below a collar 15 on a standard 16 that projects up from the upward and forward extension 12.

The lower end of the king bolt is threaded as at 17 and is screwed into a bracket 18 that extends rearwardly from forks 19.

Said forks are provided with an axle 20 for the front wheel 21 to which front wheel a ratchet wheel 22 is fixed and is adapted to be operated by a pawl 23 that is connected to the lower end 24 of a lever 25 having a handle 26 and arranged to oscillate on a bearing 27 carried by the forks and provided with a pawl 23 adapted to engage the teeth of the ratchet wheel 22 when the handle 26 is drawn back, so as to revolve the wheel 21.

28' is a spring acting on a downward extension 29 of the lower end of lever 25 so that when the handle is drawn back as indicated in Fig. 2 the pawl 23 may be advanced above the teeth of the ratchet 22, thus allowing the ratchet wheel to revolve freely under the impetus given to the vehicle by the momentum of the rider in the operation heretofore.

The rearwardly deflected standard 16 is journalled by the king pin 14 in the forward extension 12 and the rearward deflection or bend of the standard 16 serves to insure against loosening or unscrewing of the king pin as such unscrewing can only take place by swinging the standard around forwardly and back a sufficient number of times to unscrew the king pin from the bracket.

In practical operation the rider grasping the cross handle 26 will move it forward and back; and as the handle moves forward, the pawl will be brought back over the teeth of the ratchet 22 and then a rearward movement of the handle will thrust the pawl forward and cause the front wheel 21 to revolve thus driving the vehicle.

The rider may start the vehicle in the usual way of riding scooters and hold the handle either in the forward position or in the rearward position without operating the lever and he may operate the lever to give impulse to the front wheel and at the same time may use the handle to guide such wheel.

When desiring to slow down or stop, he will press his heel on the brake button; and by choice, he will ride with his heel in the guard 11 so that he will invariably press upon the button when he forces his heel down.

In Figs. 4 and 5 the platform 31 is supported on the rear axle 32 by the bolster 33 and brace 34 while the front end of the platform 31 is journalled by the king bolt 35 to bracket 36; the handle 37 in this form and the two front wheels 38 are rigid to each other and are in swivelled relation to the two rear wheels 39; and the bolster 33 for the rear axle 32 is in the form of a yoke journalled at 40 to the rear axle.

I claim:

1. The vehicle set forth comprising a frame and front and rear antifriction means to support the frame, the front antifriction means comprising a propelling wheel; an upright carried by the front antifriction means; a bracket supported by the upright and pivotally connected to the front of the frame; a ratchet wheel in fixed relation to the propelling wheel; a lever mounted to oscillate on the upright; a pawl pivotally mounted on the lever and adapted to engage the ratchet wheel; and a handle to operate the lever.

2. The vehicle set forth comprising a frame and front and rear antifriction means to support the frame, the front antifriction means comprising a propelling wheel; an upright carried by the front antifriction means; a bracket supported by the upright; swivel means connecting the front end of the frame to the bracket; a lever mounted to oscillate on the upright and provided with a handle at its upper end; and means connecting the lever to turn the propelling wheel forward when the handle of the lever is drawn backward.

3. A vehicle of the character set forth comprising front and rear wheels, the front wheel being provided with a ratchet and mounted on an axle, a support carried by the axle of the front wheel; a handle oscillatably mounted on the support, the frame being pivoted to the support; a handle pivoted to the support and adapted to be oscillatable forward and back; a pawl carried by said handle and adapted to give impulse to the ratchet wheel; and a spring adapted to yieldingly hold the pawl in ratchet engaging position when the handle is moved to the front.

4. A vehicle of the character set forth comprising front and rear wheels, the front wheel being provided with a ratchet and mounted on an axle, a support carried by the axle of the front wheel; a handle oscillatably mounted on the support, the frame being pivoted to the support, a handle pivoted to the support and adapted to be oscillatable forward and back; a pawl carried by said handle and adapted to give impulse to the ratchet wheel; a spring adapted to yieldingly hold the pawl in ratchet engaging position when the handle is moved to the front; and a standard to stop the rearward movement of the handle when the pawl is forward out of engagement with the ratchet.

5. In a vehicle of the character set forth having a support journalled to the front axle and a bracket extending rearwardly; a king bolt connecting the frame of the vehicle to the bracket and provided with a collar, the lower end of said king bolt being threaded into the bracket and the collar resting on the frame.

6. The combination set forth of a movable handle and a hand propelled vehicle; the handle being so mounted with relation to the vehicle that it can be moved forward and backward to transmit motion to a wheel of a vehicle by means of a pawl and ratchet wheel device, which may be in duplicate or more, the pawl being attached movably on a horizontal axis at the base of the handle, and the ratchet wheel being attached to the wheel or axle to be turned, said handle oscillating on a horizontal axis above the pawl so that the pawl delivers a forward push to the ratchet as the handle is pulled back; the handle being connected to the front wheel of the vehicle and adapted and arranged to be used to guide the vehicle; and also to be held stationary while the vehicle continues moving.

7. A vehicle provided with a driving wheel having a ratchet wheel; an upright carried by the driving wheel; a body pivoted to the upright; and an oscillatable handle pivoted to the upright and provided with a pawl to engage the ratchet to propel the driving wheel.

In testimony whereof, I have hereunto set my hand at Los Angeles, California, this 9th day of January, 1926.

GEORGE H. DUNLOP.